(No Model.) 4 Sheets—Sheet 1.
W. P. JONES.
INCUBATOR AND BROODER.
No. 586,088. Patented July 6, 1897.
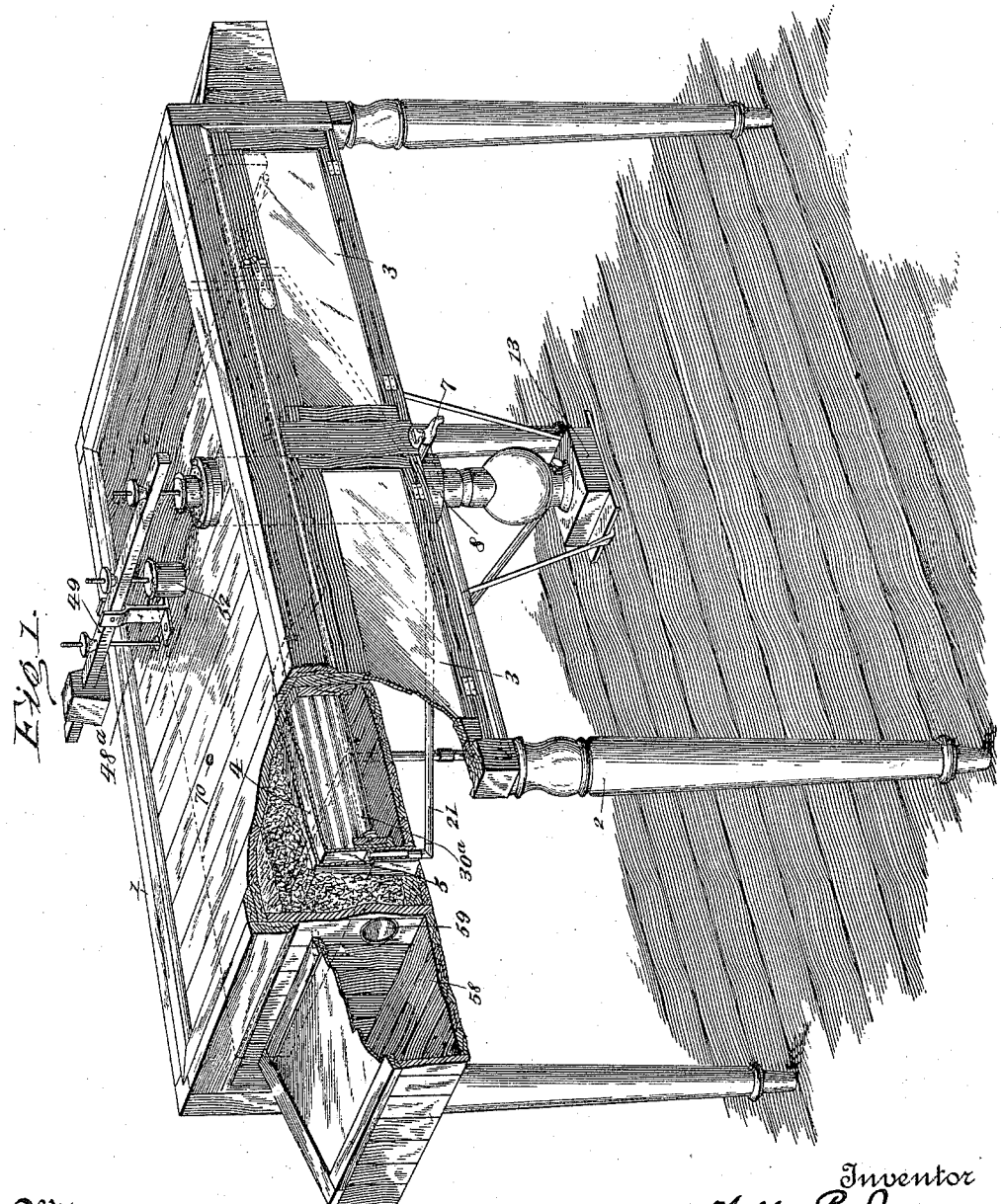
Witnesses
Thos. L. Gatch
Robt. H. McPherson Jr.
Inventor
Walter P. Jones
by O. T. Stockbridge & Son.
his Attorneys.

(No Model.) 4 Sheets—Sheet 2.
W. P. JONES.
INCUBATOR AND BROODER.
No. 586,088. Patented July 6, 1897.
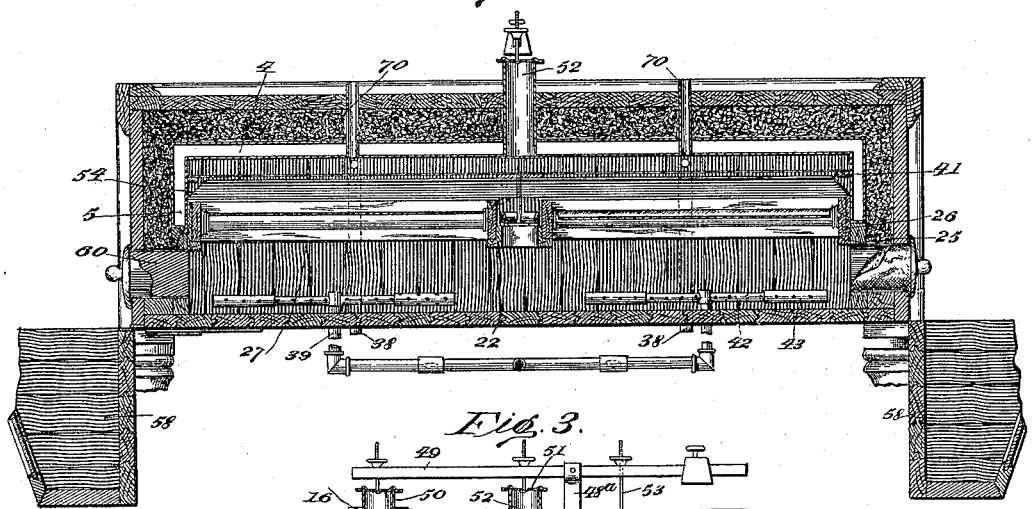
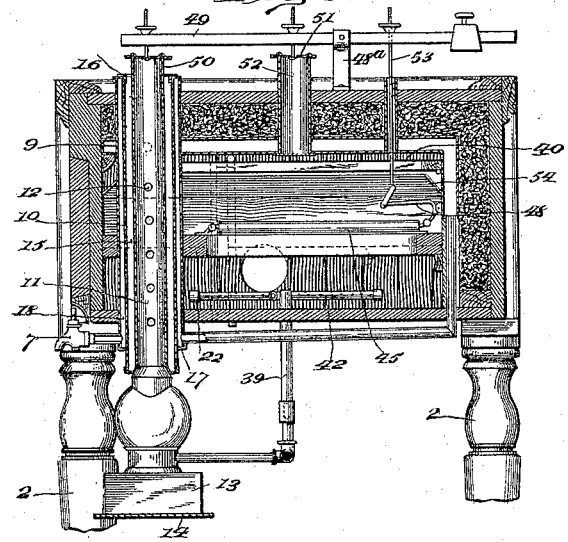
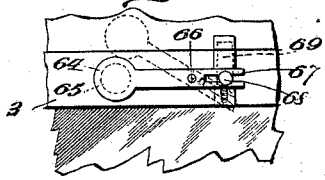
Witnesses
Inventor
Walter P. Jones
by V. D. Stockbridge & Son.
his Attorneys.

(No Model.) 4 Sheets—Sheet 3.
W. P. JONES.
INCUBATOR AND BROODER.
No. 586,088. Patented July 6, 1897.
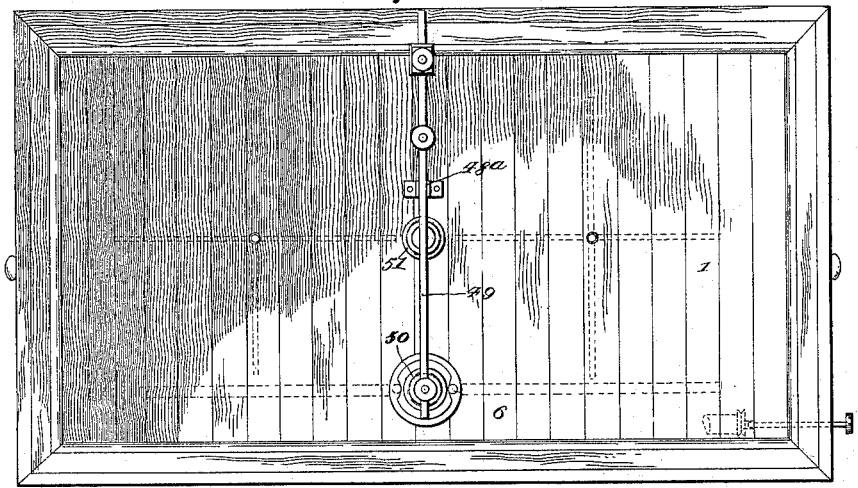
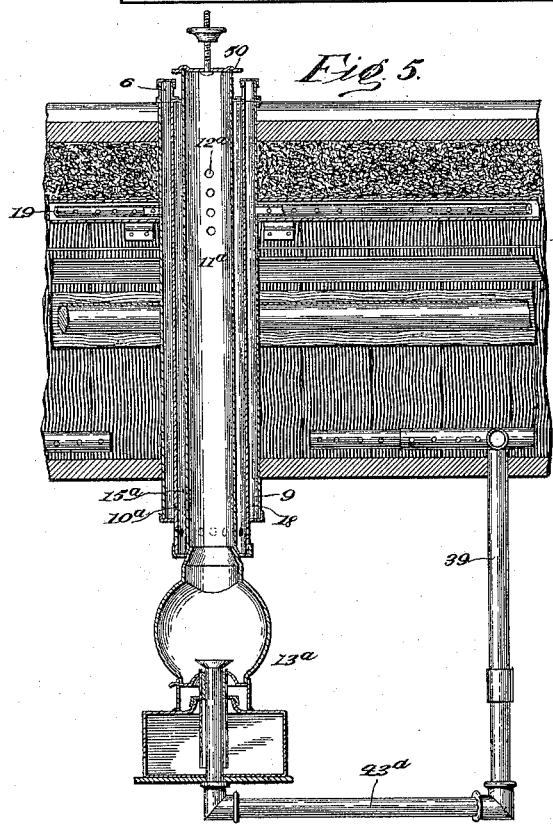
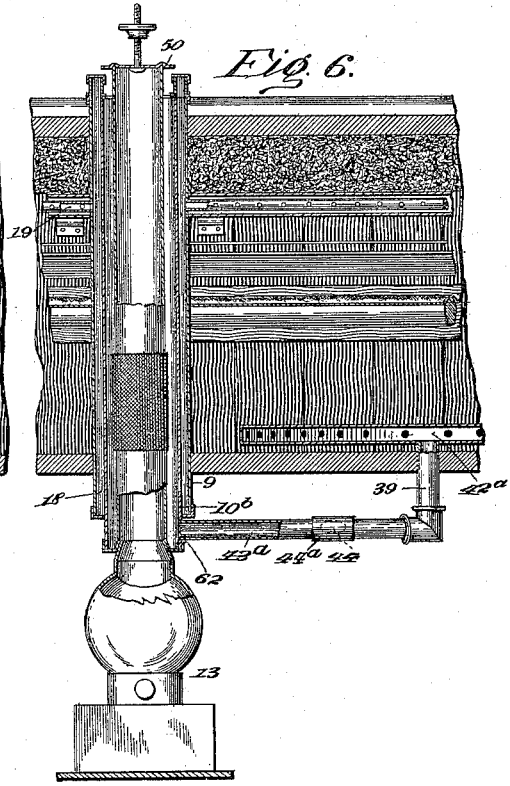
Witnesses
Thos. L. Gatch.
Robt. A. McPherson.
Inventor
Walter P. Jones
by D. D. Stockbridge & Son
his Attorneys.

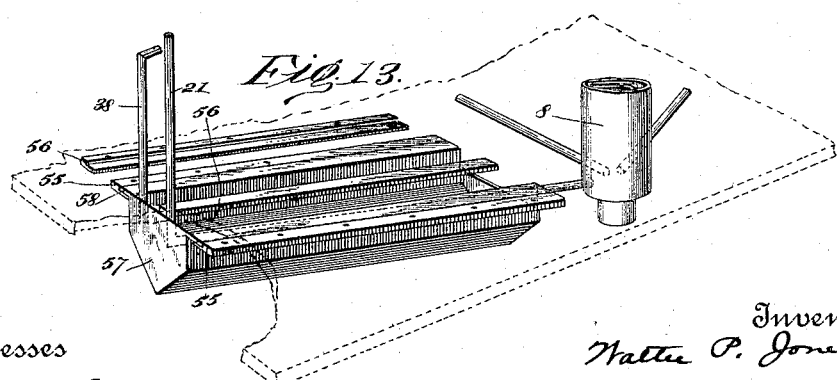

UNITED STATES PATENT OFFICE.

WALTER P. JONES, OF CARLINS, VIRGINIA.

INCUBATOR AND BROODER.

SPECIFICATION forming part of Letters Patent No. 586,088, dated July 6, 1897.

Application filed November 4, 1895. Serial No. 567,873. (No model.)

*To all whom it may concern:*

Be it known that I, WALTER P. JONES, a citizen of the United States, residing at Carlins, Alexandria county, Virginia, have invented certain new and useful Improvements in Incubators and Brooders; and I do hereby declare that the following is a full, clear, and exact description of the invention, such as will enable others skilled in the art to which it appertains to make and use the same.

Artificial incubation is a subject which has occupied the attention of many poultry-breeders and others within recent years, and the result of all experiments has been that the best hatches are secured the more nearly the methods of nature are followed. With many of the machines now upon the market actual experiment shows that while a large percentage of the fertile eggs will be hatched at one time, at another the percentage will fall so low as to lead to the deduction that something is radically wrong in the method of construction of the machine. An incubator that will operate effectively and regularly at all seasons of the year and under varying conditions of outside temperature, drafts, &c., is what is demanded by the public, and it is in answer to this demand that my present invention was made.

In following nature's method a properly-constructed incubator should have a provision of means for imparting and maintaining a steady temperature at a predetermined degree of heat, means for applying the heat from above the eggs without exposing them to direct radiation from the heating-body, means for securing a proper ventilation of the egg-chamber by drawing off the carbon dioxid generated by the eggs and supplying fresh air to all parts of the egg-chamber, heating it as it is supplied and avoiding drafts or air-currents or the admission of chilled air at any point, means for supplying moisture and air to the egg-chamber in proper and varying quantities during the process of incubation, and means for turning the eggs without exposing them to the temperature of the outside air.

It consists of means for ventilating the egg-chamber, embracing air-inlet supply-pipes leading from the outside of the casing through the water-tank to a point above the egg-trays, and discharge-pipes leading from the egg-chamber beneath the egg-trays to the lamp or source of heat-supply.

It consists, further, in an improved thermostat and temperature-regulator, and in certain details of construction, combinations of parts, and arrangements of instrumentalities, all of which will be more fully hereinafter described and claimed.

In the drawings forming a part of this specification, Figure 1 is a perspective view of my machine complete, the outer casing being partly broken away. Fig. 2 is a vertical central longitudinal section through the same. Fig. 3 is a cross-section on the line $xx$ of Fig. 2. Fig. 4 is a plan view. Fig. 5 is a vertical sectional view of a modified form of water-heater. Fig. 6 is a similar view showing another modification of the same. Fig. 7 is a section through one of the egg-trays. Fig. 8 is an end view of the same, the side bar of the frame being broken away. Fig. 9 is a section through the casing of the machine, showing one of the egg-trays in position therein. Fig. 10 is a plan view of one form of thermostat employed by me. Fig. 11 is a similar view of another form. Fig. 12 is a sectional view of the latter, showing its connection with the water-tank. Fig. 13 is a detail view of the moisture-pan, showing its connection with the under side of the casing. Fig. 14 is a detail of the door-latch and its cut-off operating mechanism. Fig. 15 is a detail perspective view of a modified form of device for drawing air from different parts of the egg-chamber.

Like reference-numerals indicate like parts in the several views.

The machine has the usual casing 1, mounted upon suitable legs 2 2 and provided with openings in the front thereof, in which fit the doors 3 3. Upon the inside of the casing is secured a water-tank 4, constructed of sheet metal and formed with water-legs 5 upon its sides and rear end. It is provided also with openings 6 6 at its upper end, through which it may be filled with water, and with a cock 7, through which the water may be emptied when desired. Located at the forward central part of the machine is an upright water-heater 8, formed of three concentric tubes 9, 10, and 11. The inner tube 11 is perforated at intervals, as shown at 12, and into the lower end of said tube projects the chimney of a lamp 13, supported upon a suitable bracket 14, secured to the bottom of the casing 1.

The lamp employed may be of any suitable form of construction, but I prefer one in which the air to supply combustion is admitted at a point above the oil-receptacle and beneath the flame. The annular space 15 between the tubes 10 and 11 constitutes a flue through which the products of combustion from the lamp escape, the same passing through the openings in a disk 16, surrounding the top of the tube 10, the said disk being provided for the purpose of maintaining the inner tube 11 always in a central position. This tube 11 is supported at its lower end upon the flange of an annular disk 17, secured to the lower end of the tube 10 and is adapted to be removed from its seat for cleaning or any other purpose that may be desired. The annular space 18 between the outer tube 9 and the intermediate tube 10 is normally filled with water and constitutes the water-heating chamber, the same being connected to the water-tank 4 at the top through a pipe 19, having radiating perforated dispensing-arms 20 20 connected thereto, by means of which the water from the heating-chamber 18 is distributed evenly throughout the upper part of the tank 4. The chamber 18 is also connected to the tank 4 by return-pipes 21 21, leading from the water-legs 5 to points near the lower end of said chamber. By this construction it will be seen that the products of combustion from the lamp 13 pass upwardly into the tube 11, thence through the perforations 12 in said tube into the annular space 15, impinging directly against the inner surface of the tube 10, and out of the top of the heater through the openings in the disk 16. During this passage of the products of combustion the water in the chamber 18 is heated and, expanding, passes upward and is discharged through the pipe 19 and its perforated arms 20 into the upper part of the tank 4. At the same time the cooler water in the tank is drawn from the water-legs 5 through the pipes 21 and returned to the heating-chamber 18 at the lower end thereof, thereby producing a complete and thorough circulation through the tank and heater and maintaining a substantially regular temperature of the water throughout all parts of the tank.

Located centrally of the egg-chamber and extending from the front to the rear thereof is a board 22, perforated for the passage of the water-heater 8 therethrough and provided with an elongated slot 23, for a purpose which will hereinafter appear. The sides of said board are formed with ledges 24, which with similar ledges 25 on the blocks 26, secured to the inside of the casing 1, form the guideways for the egg-trays 27. These trays are adapted to be moved back and forth on these ways and to be removed entirely from the machine through the doors 3 when so desired. Each of the trays is made up of a pair of longitudinal bars 28, connecting cross-bars 29 at their ends and at intermediate points, and a series of parallel horizontally-disposed rollers 30, arranged between the side bars 28. These rollers are slightly separated from one another and are covered by a loose sheet of fabric $30^a$, which may be fastened to the outer rollers of the series, as shown. On top of this sheet of fabric the eggs are placed, the same resting between adjacent pairs of rollers. This fabric may, however, be dispensed with and the eggs placed directly on the rollers without departing from the nature or spirit of my invention. The inner end of each roller has secured to it a metallic disk 31, having a pintle 32 projecting therefrom which fits a suitable recess in the inner bar 28, and the outer end of each roller has secured to it a disk or roller 32, having an angular peripheral groove 33 therein and provided with a pintle 34, which projects into a recess on the outer bar 28. The pintle $34^a$ on one of the disks or rollers 32 projects out through the bar 28 and is formed with a central rectangular recess for the reception of a crank or key 35, inserted through a slot 36 in the side of the casing 1 for turning said roller. All of the rollers 30 are geared together, so as to rotate in unison and in the same direction, by means of a cord 37, which is wound around each of the disks 32 within the angular peripheral grooves 33. By this means the rollers 30 may all be rotated in unison and the eggs thereon turned without removing the tray from the machine or opening any of the doors by simply inserting the key or crank 35 through the opening 36 into the square or rectangular recess in the pintle $34^a$ and turning the same.

The ends of the cord 37 on the under side of the rollers 30 have attached to them ball-stops $37^a$, which are connected together through a short coil-spring $37^b$ for maintaining the proper tension in the cord. The spring $37^b$ is of such length or the ends of the cord are separated to such a degree that a rotation of the rollers 30 a distance just sufficient to turn the eggs half over will bring one or the other of said stops $37^a$ into engagement with the peripheral groove 33 at one or the other end of the tray. In this way a stop is made to further turning of the rollers in the same direction and the spring $37^b$ is prevented from being turned around the rollers 30.

The feature of my invention to which I attach great importance is that relating to the means for ventilating the egg-chamber. This consists of air-inlet pipes 38 38, extending from the outside through the water-tank or one of the legs thereof into the upper part of the egg-chamber above the trays 27, and exhaust-pipes 39 for the escape of the carbon dioxid and other deleterious gases generated by the eggs located beneath the egg-trays 27. The air in passing through the pipes 38 is heated by the water in the tank 4 and is diffused evenly over the upper surface of the eggs through the agency of a horizontally-arranged diaphragm 40, made of fabric or other suitable material and supported upon lugs 41 upon the inner surface of the water-legs 5. This diaphragm also serves to prevent direct radiation of heat from the water-tank and to break up all currents of air coming into the chamber. The upper end of the exit-pipe 39 has connected to it a series of perforated tubular arms 42, by means of which the waste gases are drawn into the pipe 39 from different parts of the egg-chamber beneath the trays 27. The arms 42 are adapted to be turned in their bearings with the pipe 39, so that they may be adjusted to any points within their range of movement. They are also provided with extension-caps 43 43, which may be moved back and forth thereon for the purpose of regulating the amount of air and waste gases drawn from the egg-chamber into said pipe and also for regulating the point along the length of said arms from which the air is drawn. Instead of the arms 42, however, I may employ for the same purpose a perforated hollow disk-like chamber 42$^a$, connected to the upper end of the pipe 39, as clearly shown in Figs. 6 and 15. The lower end of the pipe 39 is connected through a coupling 43$^a$ with the lamp 13 at the point at which the air-supply of said lamp is received. In Fig. 3 this connection is shown at a point above the oil-receptacle and beneath the flame and is the form which I prefer to use. The coupling 43$^a$ is cut away or slotted at one point, as shown at 44, and surrounding said coupling is a movable sleeve 44$^a$, which is adapted to close entirely or to regulate the size of the opening 44.

From the above description it is manifest that the connection between the pipe 39 and the lamp 13 will create a suction from the lower part of the egg-chamber, drawing the air and waste gases therefrom to supply the combustion of the lamp. This displacement of air and waste gases from the egg-chamber will cause a forced draft of fresh air from without to be drawn through the pipes 38, heated in its passage therethrough, and diffused evenly by means of the diaphragm 40 throughout the whole of the egg-chamber. As the lamp draws all its air to support combustion through the coupling 43$^a$, it may be found that unless suitable means be provided too large a quantity will be drawn from the egg-chamber. The opening 44 and the means for regulating the size of said opening by the movable collar 44$^a$ have been provided for the purpose of anticipating such trouble.

In order to maintain a constant degree of heat in the egg-chamber, it has been customary to provide a thermostat for actuating a damper-operating device. I have devised a new and improved form of thermostat in which I attain a wide range of movement and a high degree of power. This consists of a pair of coacting hollow tubes 45, elliptical in cross-section, which are connected at one end to a stationary part of the framework and at the other end to a movable part of the damper-operating mechanism. In one form of my invention (illustrated in Fig. 10) these tubes are bent upon simple curves whose concave portions are in juxtaposition with each other. They are located between the egg-trays 27 above the board 22 and extend around the elongated slot 23 therein. Their inner ends are secured by a ball-and-socket joint 46 or by any other suitable connection, whereby a slight lateral or downward movement is permitted, but longitudinal movement is prevented, to a bracket 47, secured to the board 22. Their outer ends are flexibly connected to one arm of a bell-crank lever 48.

Fulcrumed in an arm or bracket 48$^a$ on the upper side of the casing 1 is a lever 49, carrying at its forward end a cap or damper 50, normally fitting over and closing the top of the tube 11, heretofore described. It also carries at an intermediate point a damper 51, which normally fits over and closes the upper end of a pipe 52, constituting a flue leading from the upper part of the egg-chamber above the diaphragm 40. The lower end of the flue 52, which enters the egg-chamber, is covered by a sheet of wire-gauze, which prevents the ingress of cold-air currents when the damper 51 is open. Means, as thumb-screws, are provided for adjusting the position of the dampers 50 and 51 on the lever 49. The damper 51 is so adjusted relatively to the damper 50 that a small amount of lost movement is had between it and the lever 49, in order that it will not be operated to uncover the flue 52 until the damper 50 has been elevated out of contact with the upper end of the tube 11. In this way the flue 52 is made to serve merely as an emergency-flue. The rear end of the lever 49 is connected through a pitman 53 with the other arm of the bell-crank lever 48, before referred to.

The tubes 45 of which my thermostat is made up contain a substance which is sensitive to heat and expansible under its influence. As thus filled and constructed, it will be seen that if the temperature in the egg-chamber rises above a predetermined point from any cause an expansion of the material in the tubes 45 will take place, causing the latter, by reason of their elliptical shape in cross-section, to straighten out. This, by reason of the fixed connection of the front ends of said tubes, will cause a downward movement of the upper arm of the bell-crank lever 48, which, through the pitman 53, will cause a depression of the rear end of the lever 49 and an elevation of the forward end of said lever. As the elevation of the front end of the lever takes place the cap or damper 50 is removed from the top of the tube 11 and the products of combustion from the lamp 13 pass out through the upper end of said tube instead of taking their normal course through the perforations 12 and impinging against the tube 10, constituting the inner wall of the water-heating chamber 15. Not only then is the water in the chamber 15 deprived of the heat of the lamp, but a reversed draft of cold air from the outside is drawn through the opening in the disk 16. This causes an immediate but gradual cooling of the water in the tank 4, and as soon as the temperature in the egg-chamber falls back to its proper degree a contraction of the material in the tubes 45 takes place and the reverse operation to that described is brought about, the damper 50 being restored to its normal position over the top of the tube 11. If, however, the temperature in the egg-chamber should continue to rise, a continued straightening of the thermostatic tubes will take place, the lever 49 will be still further depressed, and the damper 51 will be raised in addition to the damper 50. This action uncovers the upper end of the flue 52 and permits the escape of the heated air therethrough, causing an ultimate cooling of the egg-chamber by creating a draft of cooler air from the inlet-pipes 38 38 through the upper part of the egg-chamber above the diaphragm 40 and preventing further heating of the eggs from the water-tank 4, which is also cooled by the passing of the air through the machine.

The thermostatic tubes 45 contain a substance which is so compounded and is inserted into the tubes in such quantity that it begins to act upon the tubes at a predetermined degree of heat, say 102° Fahrenheit. Both tubes being set to act at the same temperature, their combined power is brought to bear upon the damper-regulating device at the same time. It will often be found, however, that if the heat in the egg-chamber rises but slightly above the temperature at which the thermostat is set a small opening of the damper will be sufficient to restore the proper temperature; but there is a degree of heat, generally placed at about 105° Fahrenheit and above, which, if maintained for a few hours, will either kill the embryo chickens outright or hatch them in a weakly puny condition. In order to prevent the egg-chamber ever reaching and remaining at this temperature, I may place in one of the tubes of my thermostat a material which becomes active at one temperature, say 102°, and in the other one which becomes active at a higher temperature, say 104°. Materials of the class above mentioned are well known in the art. In this way I get a small range of movement to my damper from the first tube at 102° and a larger range of movement from the combined action of both when 104° is reached.

By referring to Fig. 10 this action of the tubes 45, when adjusted as described, to act at different temperatures will be more clearly understood. Assume that the upper tube in said figure is supplied with a liquid acting to straighten the tube at 102° and the lower tube at 104°. The upper tube will be the first to straighten, thus moving the end of the connecting-link shown at the free end of said tube, the opposite end of said link pivoting on the end of the lower tube. This movement operates the bell-crank lever 48 a certain distance beyond the pivotal point of the link and by the connecting devices heretofore described the damper 50 (and possibly damper 51, according to adjustment) is opened. Should the temperature still rise so as to affect the lower tube, it straightens and moves the pivotal point of support of the link, together with the arm of the bell-crank, forward, the link pivoting at its opposite end not at its normal place, (that which it occupied before it was operated by the upper tube,) but at the advanced place to which the straightening of the upper tube has carried it, so that the action of the lower tube is more powerful and more effectively opens the dampers to more speedily reduce the existing excessively-high temperature within the apparatus. Ordinarily the upper tube alone controls the temperature for normal conditions, but when the degree of heat in the apparatus gets above the normal the lower tube then acts on the already advanced connecting-link with more power and effectiveness by reason of such advancement.

As to the material employed inside of the tubes 45, any material liquid or otherwise, which will expand when heated may be employed. In the prior art ether and bisulfid of carbon have been employed in different proportions, in accordance with the degree of temperature desired, to effect an expansion of said liquids.

In use it has been found that where the mixture of ether and bisulfid of carbon is used in the tubes in small quantities a vapor is formed therein at different degrees, according to the proportions of the materials used; but I do not limit myself to the use of the materials above named, nor to filling or partially filling the tubes, as it may be found expedient to use solid material in the tubes.

The coefficient of expansion of various liquids may be utilized and regulated by the admixture thereof.

I do not confine my invention to the exact form of thermostat herein shown and described, as I may employ different connecting devices in specific details, whereby I may utilize the successive action of the members constituting the thermostat.

The exact proportions of ether and bisulfid of carbon constituting the mixture employed in the thermostatic tubes cannot be arbitrarily fixed by reason of the different characteristics of individual tubes and of the character of the mechanism which they are intended to operate, and, furthermore, by reason of the impossibility of obtaining those liquids which volatilize always at the same degree of temperature. In practice each thermostat must be tested with various proportions of the mixture until it operates at the desired predetermined degree. It is of course to be understood that my invention is not limited to any particular material or proportion thereof employed in or as a thermostat.

Instead of using the tubes 45 bent on a simple curve I may use them bent in sinuous form or upon compound curves.

In the modified form of my thermostat shown in Figs. 11 and 12 the tubes $45^a$ are connected through a flexible coupling 63 to the interior of the water-tank 4 or to one of the legs thereof, so that they are in communication with the water in said tank. When this form of thermostat is used, it is necessary that the filling-openings 6 6 be hermetically sealed after the tank has been filled. The thermostat in this case operates by reason of changes in the temperature of the water in the tank rather than by reason of changes of temperature in the air of the egg-chamber.

Water-tanks have been constructed in the past with downwardly-depending water-legs, but objection has been raised to them on the ground that direct radiation of heat from the water-legs was detrimental in that it caused the eggs adjacent thereto to be subjected to a higher temperature than was necessary. In order to obviate this objection, I locate above the block 26 an angularly-disposed heat guard or deflector 54, which extends around the sides and rear of the water-leg between said water-leg and the egg-trays 27. By this means the heat from the water-legs is thrown upwardly against the diaphragm 40 and is diffused equally throughout the egg-chamber. With the use of this heat guard or deflector I find the water-legs 5 to be a great advantage rather than a detriment, in that they serve to protect the eggs against variations in the temperature of the outside air.

In supplying moisture to the eggs it is important that some means be provided whereby a larger amount may be admitted to the egg-chamber during the latter part of the period of incubation than during the early part. In many machines this moisture is furnished by placing pans containing water inside the casing, an increased amount being obtained, when required, by increasing the number of pans or the surface area of the water in the pans. The means provided by me is much simpler, more effective, and more easily manipulated than the crude means heretofore employed. This consists of providing two sets of ways 55 and 56, arranged in pairs on the under side of the casing 1, and an elongated pan 57 for holding water, having flanges 58 58 along its sides which are adapted to fit and move in one or the other of said pairs of ways. The ways 55 are so located that the lower end of one of the air-inlet pipes 38 projects between the same, and the ways 56 are so located as to take in between them the lower end of the air-inlet pipe and the horizontal portion of one of the return water-pipes 21, leading from the water-legs 5 to the water-heating chamber 18. The normal position of the pan 57 during the first part of the period of incubation is in the ways 55 55, and the air admitted through the air-inlet pipes 38 passes over the upper surface of the water in said pan and carries with it a sufficient amount of moisture for the eggs during this period of the hatch. The position of the pan during the latter part of the period of incubation is in the ways 56 56, and the water therein is heated by the radiation of heat from the return-pipe 21 and an increased amount of moisture is created in the air which enters through the inlet-pipe 38.

When the hatching begins, the chicks may pass from the egg-trays 27 to the bottom of the casing through the elongated slot 23 in the board 22, and the machine from this time on serves as a brooder, the egg-trays being removed after the hatching is completed. Hinged to the side of the casing 1 is a box or receptacle 58, which serves as a run for the chicks when the machine is used as a brooder and may be folded down out of the way during the process of incubation. Extending through the sides of the casing 1 at the lower part of the egg-chamber are openings 59 59, which lead into the runs 58 when the latter are in their upper positions. When the machine is used as an incubator, these openings may be stopped up by plugs 60, made of wood and covered with a surrounding strip of felt or other packing material, and they may be easily removed from and inserted into the openings 59 by means of the knobs 61 thereon.

In Fig. 5 I show a modified form of my water-heater, wherein the perforations $12^a$ in the tube $11^a$ are located near the top of said tube, and the normal discharge-outlet for the products of combustion from the annular chamber $15^a$, between the tubes $11^a$ and $10^a$, is at the lower end thereof. In this form of the invention I draw the waste gases from the egg-chamber through the pipe 39 and admit them to the lamp $13^a$ through the central air-flue provided therein.

In Fig. 6 a still further modification of the water-heater is shown, in which the lower end of the tube $10^b$ has an opening 62, through which the carbonic-acid gas and air from the egg-chamber are drawn by the suction created by the lamp and discharged through the opening in the disk 16 at the top of tube 10.

I have described heretofore the connection between the interior of the egg-chamber and the lamp 13, which it will be remembered is through the pipe 39 and coupling $43^a$, leading to a point adjacent to the flame. Now it has been found that the opening or closing of the doors 3 will cause a suction of air from the flame or a puff against it, which may result in the extinguishment of the lamp altogether. To provide against such a contingency, I have devised automatic means for opening a port in the door before the latter is entirely closed and just as it is being opened. This is clearly illustrated in Figs. 1 and 14, and consists of a cut-off plate 64, which normally closes the port 65 in the door 3 and acts in the nature of a lever fulcrumed at 66 to the side of the door and having bifurcated outer ends 67, which surround a pin 68 or a knob on a spring-latch 69, by which the door is fastened. In opening the door 3 it is necessary to draw back the latch 69, and this act automatically swings the cut-off 64 out of range of the port 65 and permits momentarily the flow of air therethrough. A similar operation takes place in closing the door, the spring-latch 69 being withdrawn by the engagement of its inclined or beveled end with its keeper. While I prefer to locate the port 65 in the door 3, as described, it is obvious that it may be in any part of the casing 1, with suitable connections between it and the door, through which the functions above noted are performed.

70 70 represent openings or tubes leading through the top of the casing to the interior of the egg-chamber for the convenient introduction and removal of thermometers. The temperature of the egg-chamber may thus be noted at any time without the necessity of opening the doors of the casing and admitting cold air. These tubes will be closed by suitable corks or plugs when the thermometers are in place.

Instead of locating the lamp within the casing or instead of using a lamp as a heating device it is evident that, as is quite customary, it may be located outside, and where convenient a gas-jet or in very large incubators or brooders even a stove may be employed as the heating device. So, also, instead of a water-reservoir as the heating means inside and at the upper portion of the closed chamber a hot-air reservoir or compartment may be employed, as both are well known in the art as substitutes for each other as an inside heating means.

Having now described my invention, what I claim is—

1. An incubator or brooder comprising a closed chamber having a fresh-air inlet, means for heating the chamber, including a heating device and an exit-pipe connecting said chamber with the heating device whereby owing to the draft caused by such heating device a positive circulation of air within the incubator or brooder is produced substantially in the manner described.

2. An incubator or brooder comprising a closed chamber having a fresh-air inlet, means for heating the chamber and the fresh air before entering said chamber, and an exit-pipe connecting said chamber with said heating means whereby a positive circulation of air within said chamber is produced and the entrance of fresh air is controlled substantially as specified.

3. An incubator or brooder comprising a closed chamber, a heating device communicating with the upper part of said chamber, a fresh-air inlet also communicating with the upper part of said chamber whereby the fresh air is warmed before entering the chamber and an exit for vitiated air communicating with the heating device whereby owing to the draft caused by said heating device a positive circulation of fresh warm air within the chamber is produced substantially as in the manner specified.

4. In an incubator or brooder, a closed chamber, a water-reservoir, a fresh-air inlet passing through said reservoir, a water-heater communicating with said reservoir, a heating device for said heater and an air-conductor extending from said chamber and operatively connected with said heating device, substantially as specified.

5. The combination with the damper mechanism of an incubator or brooder, of a thermostat comprising two members, one of which is constructed to expand at a predetermined temperature and the other of which members is constructed to expand at a different degree of temperature substantially as described.

6. In an incubator, and in combination with the damper mechanism thereof, a thermostat comprising two members, each adapted to expand at a different degree of temperature from the other and both operatively connected with said damper mechanism; substantially as described.

7. In an incubator and brooder, the combination with a water-tank, of a water-heater made up of three concentric tubes, the intermediate and outer tubes being sealed at the top and bottom, and forming a closed chamber communicating with said tank, the inner tube being removable, adapted to rest upon a ledge projecting inwardly from said intermediate tube, perforated at intervals, and forming with said intermediate tube an annular flue for the escape of the products of combustion, a guide for said inner tube and a lamp or other heat-generating device discharging into the lower end thereof; substantially as described.

8. In an incubator and brooder, the combination with a water-tank, of a water-heater made up of three concentric tubes, the intermediate and outer tubes being sealed at the top and bottom and forming a closed chamber communicating with said tank, an annular disk or ledge secured to the lower end of said intermediate tube, the inner tube being removable, adapted to rest upon said disk or ledge, perforated at intervals and forming with said intermediate tube, an annular flue for the escape of the products of combustion, said flue being closed at its lower end, a perforated disk upon the upper end of said intermediate tube surrounding and forming a guide for said inner tube, and a lamp discharging into the lower end of the inner tube; substantially as described.

9. In an incubator and brooder having the usual egg or brooding chamber and a lamp for heating said chamber, the combination with means for admitting air to the chamber, of means for creating a suction from the chamber to said lamp to support the combustion thereof; substantially as described.

10. In an incubator and brooder having the usual egg-chamber and means for heating the egg-chamber, the combination with air-inlet supply-pipes for admitting air to the egg-chamber, of a discharge-pipe leading from said chamber, perforated arms rotatably connected to the inner end of said pipe, caps or collars fitting over the end of said arms and movable thereon, and means for creating a suction through said pipe; substantially as described.

11. In an incubator and brooder having the usual egg-chamber and a lamp for heating the egg-chamber, the combination with means for admitting air to the egg-chamber, of a discharge-pipe leading from the said chamber, and a suitable coupling connecting said discharge-pipe to a point adjacent to said lamp, whereby a suction is created through said pipe to the lamp to supply air to support the combustion of the said lamp; substantially as specified.

12. In an incubator and brooder having the usual egg-chamber and a lamp for heating the egg-chamber, the combination with means for admitting air to the egg-chamber, of a discharge-pipe leading from the said chamber, and a suitable coupling connecting said discharge-pipe directly to the lamp, whereby air to supply the combustion of the lamp is drawn from the egg-chamber; substantially as specified.

13. In an incubator and brooder having the usual egg-chamber and a lamp for heating the egg-chamber, the combination with means for admitting air to the egg-chamber, of a discharge-pipe leading from the said chamber, and a suitable coupling connecting said discharge-pipe with said lamp at a point between its oil-receptacle and the flame whereby air to supply combustion of the lamp is drawn from the egg-chamber; substantially as specified.

14. In an incubator and brooder having the usual egg-chamber and a lamp for heating the air in said chamber, the combination of means for admitting air to said chamber, means actuated by the burning of the oil in the lamp for creating a suction air from the chamber, and means for regulating the quantity of air drawn from the chamber to the lamp; substantially as specified.

15. In an incubator and brooder having the usual egg-chamber, and a lamp for heating the egg-chamber, the combination with means for admitting air to the egg-chamber, of a discharge-pipe leading from the said chamber, a suitable coupling connecting said discharge-pipe with said lamp, and a valve in said coupling, as and for the purpose set forth.

16. In an incubator and brooder having the usual egg-chamber, and a lamp for heating the air in said chamber, the combination of means for admitting air to said chamber, means actuated by the burning of the oil in the lamp for creating a suction of air from the chamber and from the outside of the machine to said lamp, and means for regulating the quantity of air drawn from said chamber; substantially as described.

17. In an incubator and brooder having the usual egg-chamber and a lamp for heating the egg-chamber, the combination with means for admitting air to the egg-chamber, of a discharge-pipe leading from the said chamber, a suitable coupling connecting said discharge-pipe with said lamp having an opening therein, and mechanism for covering and uncovering said opening, as and for the purpose set forth.

18. In an incubator and brooder having the usual egg-chamber, and a lamp for heating the egg-chamber, the combination with means for admitting air to the egg-chamber, of a discharge-pipe leading from the said chamber, a suitable coupling connecting said discharge-pipe with said lamp, having an opening therein, and a sleeve surrounding said coupling and movable thereon, for regulating the size of said opening, as and for the purpose set forth.

19. In an incubator and brooder, the combination with damper-operating mechanism, of a thermostat connected thereto, the same consisting of a pair of coacting, curved, hollow tubes containing an expansible substance; substantially as described.

20. In an incubator and brooder, the combination with damper-operating mechanism, of a thermostat connected thereto, the same consisting of a pair of expansible tubes, one of which becomes active at one degree of heat, and the other at a higher degree of heat, as and for the purpose set forth.

21. In an incubator and brooder, the combination with damper-operating mechanism, of a thermostat connected thereto, made up of a pair of curved, hollow tubes, each containing a substance expansible under the influence of heat, the substance in one of said tubes active at one degree of heat and that in the other active at a higher degree of heat, as and for the purpose set forth.

22. In an incubator and brooder, the combination with damper-operating mechanism, of a thermostat made up of a pair of coacting, curved, hollow tubes containing an expansible material, said tubes being secured at one end to a stationary part of the machine, and at the other to said damper-operating mechanism; substantially as described.

23. In an incubator and brooder, the combination with damper-operating mechanism, of a thermostat made up of a pair of coacting, curved, hollow tubes, elliptical in cross-section and containing a material expansible under the influence of heat, said tubes being secured at one end to a stationary part of the machine, and at the other end to said damper-operating mechanism; substantially as described.

24. In an incubator and brooder, the combination with damper-operating mechanism, of a thermostat made up of a pair of coacting, sinuously-curved hollow tubes, elliptical in cross-section and containing a material expansible under the influence of heat, said tubes being secured at one end to a stationary part of the machine and at the other end to said damper-operating mechanism substantially as described.

25. In an incubator and brooder having a suitable heater, the combination with a lever carrying a damper for normally closing the main outlet for the products of combustion from said heater, and a bell-crank lever, one arm of which is connected to said lever, of a thermostat located in the interior of the machine, the same consisting of a pair of coacting, curved, hollow, tubes elliptical in cross-section, flexibly connected at one end to the other arm of said bell-crank lever, and at the other end to a stationary part of the machine in such a manner that at the joint or connection a slight lateral or downward movement is permitted, but a movement in the direction of the length of the tube is prevented, as and for the purpose set forth.

26. In an incubator, damper mechanism, comprising two dampers supported by a pivot common to both dampers, in combination with a thermostat, and suitable connections whereby a plurality of dampers are controlled by one thermostat; substantially as described.

27. Damper mechanism, for incubators, comprising a plurality of dampers supported by a pivot common to all dampers, a thermostat, and suitable damper-operating connecting devices; substantially as described.

28. In an incubator, the combination with the casing having a perforation in its side, of an egg-tray moving upon suitable ways in the interior of said casing, the said tray being made up of a frame composed of longitudinal and cross bars and a series of rollers rotatably mounted therein, disks having peripheral V-shaped grooves in them secured to the outer ends of said rollers and formed with pintles thereon adapted to fit recesses in the longitudinal bars of said frame, one of said pintles extending through said bar, formed with an angular recess therein and registering with the perforation in said casing, a cord encircling each of said disks and fitting the grooves therein, and a crank or key adapted to be inserted through the opening in said casing and to engage said recessed pintle, as and for the purpose set forth; substantially as described.

29. In an incubator and brooder having the usual water tank and heater, the combination with a water-pipe leading from said tank and an air-inlet pipe leading to the interior of the machine, of a moisture-pan, and means whereby said pan may be adjusted in juxtaposition to the entrance of the air-inlet pipe alone, at one time, and in juxtaposition to both the air-inlet and water pipes, at another time, as and for the purpose set forth.

30. In an incubator and brooder having the usual water-tank and water-heater, the combination with a return-water pipe extending along the under side of the machine, and an air-inlet pipe whose outer end is adjacent thereto, of a moisture-pan, and means whereby said pan may be adjusted beneath the air-inlet pipe alone at one time, and beneath both the air-inlet and return-water pipes at another time, as and for the purpose set forth.

31. In an incubator and brooder having the usual water-tank and water-heater, the combination with a return-water pipe extending along the under side of the machine and an air-inlet pipe whose outer end projects beneath said machine, of two pairs of guideways secured to the under side of the machine between one of which pairs extends the lower end of said air-inlet pipe along, and between the other of which extend both the air-inlet pipe and the return-water pipe, and a moisture-pan adapted to fit and move in said ways, as and for the purpose set forth.

32. In an incubator and brooder, the combination with the casing, of a brooder-run attached to said casing communicating with the egg-hatching chamber thereof, the said casing being provided with an opening leading from said hatching-chamber into said run, and a plug for closing said opening, when desired; substantially as described.

33. In an incubator having the usual egg-chamber and egg-trays therein, the combination of a water-tank having water-legs depending downwardly therefrom and terminating at points in the plane with the egg-trays, and means for heating the water in said tank; substantially as described.

34. In an incubator and brooder having the usual egg-chamber, the combination of a suitable heater, an emergency-flue leading from the upper part of said egg-chamber, dampers for normally closing said emergency-flue, and the main outlet for the products of combustion from said heater, a single thermostat actuated by the rise of temperature in the egg-chamber, for first opening the damper of said heater, and afterward opening the damper of said emergency-flue, as and for the purpose set forth.

35. In an incubator and brooder having the usual egg-chamber, the combination of a suitable heater, an emergency-flue leading from the upper part of the egg-chamber, a lever, dampers carried by said lever for normally closing said emergency-flue and the main outlet for the products of combustion from said heater, the connection between said lever and the damper covering said emergency-flue providing for a slight degree of lost motion, and means actuated by the rise of temperature in the egg-chamber, for operating said lever and opening said dampers, as and for the purpose set forth.

36. In an incubator and brooder, the combination with the casing thereof having a port leading thereinto and a door opening into said casing, of means for automatically opening said port in the act of opening or closing said door, as and for the purpose set forth.

37. In an incubator and brooder, the combination with the casing thereof and a door opening into said casing provided with a port extending therethrough, of means for automatically opening said port in the act of opening and closing said door, as and for the purpose set forth.

38. In an incubator and brooder, the combination with the casing thereof and a door opening into said casing provided with a port extending therethrough, of means actuated by the opening or closing of said door for momentarily opening said port, as and for the purpose set forth.

39. In an incubator and brooder, the combination with the casing thereof and a door opening into said casing provided with a port extending therethrough, of a cut-off for normally closing said port, and means actuated by the opening or closing of said door for momentarily moving said cut-off out of the range of said port, as and for the purpose set forth.

40. In an incubator and brooder, the combination with the casing thereof, and a door opening into said casing provided with a port extending therethrough, of a cut-off for normally closing said port pivoted to the side of said door, a lock for said door, and connections between said cut-off and a movable part of said lock, as and for the purpose set forth.

41. In an incubator and brooder, the combination with the casing thereof, and a door opening into said casing provided with a port extending therethrough, of a cut-off for normally closing said port, pivoted to the side of said door and having bifurcated outer ends a spring-latch and its keeper for locking said door, and a projection on said latch engaged by the bifurcated ends of said cut-off, as and for the purpose set forth.

In testimony whereof I affix my signature in the presence of two witnesses.

WALTER P. JONES.

Witnesses:
 WM. M. STOCKBRIDGE,
 H. E. PARKER.